United States Patent
Wang et al.

(10) Patent No.: US 12,266,834 B2
(45) Date of Patent: Apr. 1, 2025

(54) CESIUM-DEFICIENT CESIUM PHOSPHATES FOR PROTON CONDUCTING ELECTROLYTES

(71) Applicant: Northwestern University, Evanston, IL (US)

(72) Inventors: Louis S. Wang, Chicago, IL (US); Sossina M. Haile, Evanston, IL (US); Sheel S. Sanghvi, Kendall Park, NJ (US)

(73) Assignee: Northwestern University, Evanston, IL (US)

( * ) Notice: Subject to any disclaimer, the term of this patent is extended or adjusted under 35 U.S.C. 154(b) by 547 days.

(21) Appl. No.: 17/639,706

(22) PCT Filed: Sep. 3, 2020

(86) PCT No.: PCT/US2020/049117
§ 371 (c)(1),
(2) Date: Mar. 2, 2022

(87) PCT Pub. No.: WO2021/046165
PCT Pub. Date: Mar. 11, 2021

(65) Prior Publication Data
US 2022/0293988 A1  Sep. 15, 2022

Related U.S. Application Data

(60) Provisional application No. 62/895,163, filed on Sep. 3, 2019.

(51) Int. Cl.
*H01M 8/1034* (2016.01)
*H01B 1/08* (2006.01)
(Continued)

(52) U.S. Cl.
CPC ....... *H01M 8/1034* (2013.01); *H01M 8/1048* (2013.01); *H01M 8/1081* (2013.01); *H01B 1/08* (2013.01); *H01M 2008/1095* (2013.01)

(58) Field of Classification Search
CPC ........ H01M 4/86; H01M 4/923; H01M 4/925; H01M 4/926; H01M 4/921; H01M 4/8605;
(Continued)

(56) References Cited

U.S. PATENT DOCUMENTS 6,468,684 B1  10/2002  Chisholm et al.
7,125,621 B2  10/2006  Haile et al.
(Continued)

OTHER PUBLICATIONS

Navarrete, Laura, et al. "Protonic conduction of partially-substituted CsH2PO4 and the applicability in electrochemical devices." Membranes 9.4 (2019): 49. (Year: 2019).*
(Continued)

*Primary Examiner* — Nicholas A Smith
*Assistant Examiner* — Amanda Rosenbaum
(74) *Attorney, Agent, or Firm* — Bell & Manning, LLC

(57) ABSTRACT

Proton conducting materials and membranes and electrochemical devices incorporating the materials and membranes are provided. Also provided are methods of making the materials and membranes and methods of operating the electrochemical devices. The proton conducting materials are solid acids that form superprotonic phases at elevated temperatures. The superprotonic phases have a cubic structure and the general formula: $M_{(1-x)}H_y[H_2PO_4]$, where M represents one or more monovalent cations or a combination of monovalent cations and divalent cations, $0<x\leq2/9$, and y is a number that provides charge balancing.

20 Claims, 15 Drawing Sheets

(51) Int. Cl.
*H01M 8/10* (2016.01)
*H01M 8/1048* (2016.01)
*H01M 8/1081* (2016.01)

(58) Field of Classification Search
CPC .. H01M 4/881; H01M 4/8828; H01M 8/1034; H01M 8/1048; H01M 8/1081; H01M 8/0289; H01M 8/08
See application file for complete search history.

(56) References Cited

U.S. PATENT DOCUMENTS

| | | | |
|---|---|---|---|
| 8,202,663 | B2 | 6/2012 | Haile et al. |
| 10,132,942 | B2 | 11/2018 | Frisch et al. |
| 2003/0104258 | A1 | 6/2003 | Haile et al. |
| 2004/0209137 | A1 | 10/2004 | Corey et al. |
| 2012/0021338 | A1* | 1/2012 | Hong ............ B01J 23/42 429/530 |
| 2019/0151836 | A1* | 5/2019 | Bhan ............ B01J 35/651 |
| 2019/0245213 | A1* | 8/2019 | Fugane ............ H01M 4/926 |

OTHER PUBLICATIONS

Ponomareva, V. G., and G. V. Lavrova. "Effect of the excess protons on the electrotansport, structural and thermodynamic properties of $CsH_2PO_4$." Solid State Ionics 304 (2017): 90-95. (Year: 2017).*

Ponomareva, Valentina, et al. "Crystal structure and proton conductivity of a new $Cs_3$ $(H_2PO_4)(HPO_4)$Â· $2H_2O$ phase in the caesium di- and monohydrogen orthophosphate system." Acta Crystallographica Section C: Structural Chemistry 73.10 (2017): 773-779. (Year: 2017).*

Ayako Ikeda et al., "Phase behaviour and superprotonic conductivity in the $Cs_{1-x}Rb_xH_2PO_4$ and $Cs_{1-x}K_xH_2PO_4$ systems," *J. Mater. Chem. A*, 2014, 2, 204-214.

Sanghvi, Sheel, and Sossina M. Haile. "Crystal structure, conductivity, and phase stability of $Cs_3$ ($H_{1.5}PO_4$) 2 under controlled humidity." *Solid State Ionics* 349 (2020): 115291 (1-9).

Seen Ae Chae et al., "Characterization of Solid Acid Electrolyte $CsH_5(PO_4)_2$ by NMR Spectroscopy," *Bull. Korean Chem. Soc.* 2013, vol. 34, No. 11; pp. 3197-3198. http://dx.doi.org/10.5012/bkcs.2013.34.11.3197.

Valentina Ponomareva et al., "Crystal structure and proton conductivity of a new $Cs_3(H_2PO_4)$ $(HPO_4)$ $2H_2O$ phase in the caesium diand monohydrogen orthophosphate system," *Acta Cryst.* (2017). C73, 773-779.

Xiaojing Chen et al., "A proton conductor electrolyte based on molten $CsH_5(PO_4)_2$ for intermediate-temperature fuel cells," *RSC Adv.*, 2018, 8, 5225-5232.

Ponomareva, V. G., and G. V. Lavrova. "Effect of the excess protons on the electrotansport, structural and thermodynamic properties of $CsH_2PO_4$." *Solid State Ionics* 304 (2017): 90-95.

A.I. Baranov, "Crystals with Disordered Hydrogen-Bond Networks and Superprotonic Conductivity Review," *Crystallography Reports*, vol. 48, No. 6, 2003, pp. 1012-1037.

The International Search Report and the Written Opinion issued on Feb. 1, 2021 for international application No. PCT/US2020/049117; pp. 1-14.

Baran et al., Structure, phase transition and vibrational spectra of the $NaH_5(PO_4)_2$ and $NaD_5(POR)_2$ crystals, Journal of Molecular Structure, vol. 516, 2000 [retrieved on Oct. 26, 2020]. Retrieved from the Internet: ,URL: https://www.sciencedirect.com/science/article/abs/pil/S0022286099001416?via%3Dihub . . . pp. 185-202.

* cited by examiner

CESIUM-DEFICIENT CESIUM PHOSPHATES FOR PROTON CONDUCTING ELECTROLYTES

CROSS-REFERENCE TO RELATED APPLICATIONS

This application is a National Stage of International Application No. PCT/US2020/049117, filed Sep. 3, 2020, which claims priority to U.S. provisional patent application No. 62/895,163 that was filed Sep. 3, 2019, the entire contents of each of which are incorporated herein by reference.

REFERENCE TO GOVERNMENT RIGHTS

This invention was made with government support under 1807234 and 1720139 awarded by the National Science Foundation. The government has certain rights in the invention.

BACKGROUND

Proton conducting materials that are stable at intermediate temperatures (e.g., 100-500° C.) under both reducing and oxidizing atmospheres have been highly sought after as electrolytes for several electrochemical applications, including fuel cells, electrolyzer cells, hydrogen separation devices, and the like. Specifically, fuel cells which operate at intermediate temperatures have several attractive features including moderate efficiencies, high fuel impurity tolerance, and practical temperature constraints. Solid acid compounds, characterized by compositions of the formula $M_xH_y(AO_4)_z$, where M is a metal cation or mixture of metal cations, A is a cation of a polyanion, typically S, Se, or P, and x, y, and z are rational numbers, have been presented as promising electrolytes for such fuel cells. The most attractive solid acid compounds exist in phases with polyanion rotational disorder, termed superprotonic phases, which exhibit the requisite high proton conductivity as a function of the unique polyanion motion. Superprotonic phases have been discovered in solid acids based on $SO_4$, $SeO_4$, and $PO_4$ polyanions, however $SO_4$ and $SeO_4$ groups decompose under the reducing atmospheres at fuel cell anodes, forming $H_2S$ and $H_2Se$ respectively. Thus, only phosphate based superprotonic solid acids are viable as fuel cell electrolytes, and, within this category, $CsH_2PO_4$ (CDP) has thus far been the most attractive candidate. However CDP has several inherent limitations that constrain its use. CDP is only an effective proton conductor (~0.02 S cm$^{-1}$) in its high temperature superprotonic phase (>228° C.) which must be stabilized with a heavily humidified atmosphere (usually 0.2-0.4 atm pH$_2$O). As a consequence, although solid acid fuel cells were originally billed to eliminate the complex water management systems required for low temperature hydrated polymer membranes, in practice CDP-based fuel cells offer no such simplification in system design.

Several authors have sought to use chemical modification to expand the stability window of the superprotonic CDP phase and reduce the humidification requirements. The various approaches have included cation site doping with Rb, K, NH$_4$, and Ba, as well as 'heterogeneous' doping by introducing components such as $Cs_2HPO_4 \cdot H_2O$, $Ba(H_2PO_4)_2$, $SiP_2O_7$, and even $Cs_5H_5N_5O$. (Ikeda, A. et al., *J. Mater. Chem. A* 2014, 2 (1), 204-214; Baranov, A. I. et al., *Ferroelectrics* 2002, 272 (November 2014), 225-230; Ponomareva, V. G. et al., *Phys. Solid State* 2017, 59 (7), 1387-1394; Ponomareva, V. G. et al., *Solid State Ionics* 2019, 329 (December 2018), 90-94; Ponomareva, V. G. et al., *Phys. Solid State* 2017, 59 (9), 1829-1835; Mohammad, N. et al., *J. Alloys Compd.* 2017, 690, 896-902; Yoshimi, S. et al., *J. Power Sources* 2008, 179 (2), 497-503; and Oh, S. Y. et al., *Solid State Ionics* 2012, 225, 223-227.) Ponomareva et al. studied the impact of Cs deficiency on CDP, achieved by addition of excess $CsH_5(PO_4)_2$ or $H_3PO_4$. (Ponomareva, V. G et al., *Solid State Ionics* 2017, 304, 90-95.) While the authors reported unusually high proton conductivities at temperatures below the superprotonic transition temperature of CDP, the phase behavior was not characterized.

SUMMARY

Proton conducting materials, devices, such as fuel cells, that incorporate the materials as proton conducting membranes, methods of using the devices, and methods of making the proton conducting materials are provided.

One embodiment of a proton conducting material includes a superprotonic phase of a solid acid, the superprotonic phase having a cubic structure and the general formula: $[M_{(1-x)}H_y]H_2PO_4$, where $0<x\leq 0.2$ $\overline{2}$, wherein M represents one or more monovalent and/or divalent cations, such as monovalent and/or divalent metal cations, and y is a number that provides charge balancing.

One embodiment of a device that incorporates a proton conducting material, as described herein, includes an anode, a cathode, and the proton conducting membrane in electrical communication with the anode and the cathode, the proton conducting membrane comprising a superprotonic phase of a solid acid, the superprotonic phase having a cubic structure and the general formula: $[M_{(1-x)}H_y]H_2PO_4$, where $0<x\leq 0.2$ $\overline{2}$, wherein M represents one or more monovalent and/or divalent cations, such as monovalent and/or divalent metal cations, and y is a number that provides charge balancing.

One embodiment of a method of operating device as described above as a fuel cell includes the steps of: feeding a fuel into the anode where it is oxidized to form electrons that pass externally to the cathode and protons that pass through the proton conducting membrane to the cathode; and feeding an oxidizing agent into the cathode where it reacts with the protons from the anode to produce water.

One embodiment of a method of making a solid acid that forms a superprotonic phase having a cubic structure and the general formula: $[M_{(1-x)}H_y]H_2PO_4$, where $0<x\leq 0.2$ $\overline{2}$, wherein M represents one or more monovalent and/or divalent cations, such as monovalent and/or divalent metal cations, and y is a number that provides charge balancing, includes the step of: reacting a stoichiometric mixture $MH_2PO_4$ and $MH_5(PO_4)_2$.

Other principal features and advantages of the invention will become apparent to those skilled in the art upon review of the following drawings, the detailed description, and the appended claims.

BRIEF DESCRIPTION OF THE DRAWINGS

Illustrative embodiments of the invention will hereafter be described with reference to the accompanying drawings, wherein like numerals denote like elements.

(FIG. 4A) rendition of the asymmetric unit, depicting atomic displacements; (FIG. 4B) projection of the unit cell along [100]; (FIG. 4C) projection along [111]; and (FIG. 4D) idealized depiction of the arrangement of species on the cation sites. In FIG. 4A unlabeled atoms are oxygen; in FIGS. 4B-4D, $H_nPO_4$ groups are shown as polyhedra, with those about P1 and P2, the polycations, shown in grey, and those about P3 and P4, the polyanions (not depicted in FIG. 4D), shown in light grey; Cs atoms are shown in dark grey.

DETAILED DESCRIPTION

Figure 1:
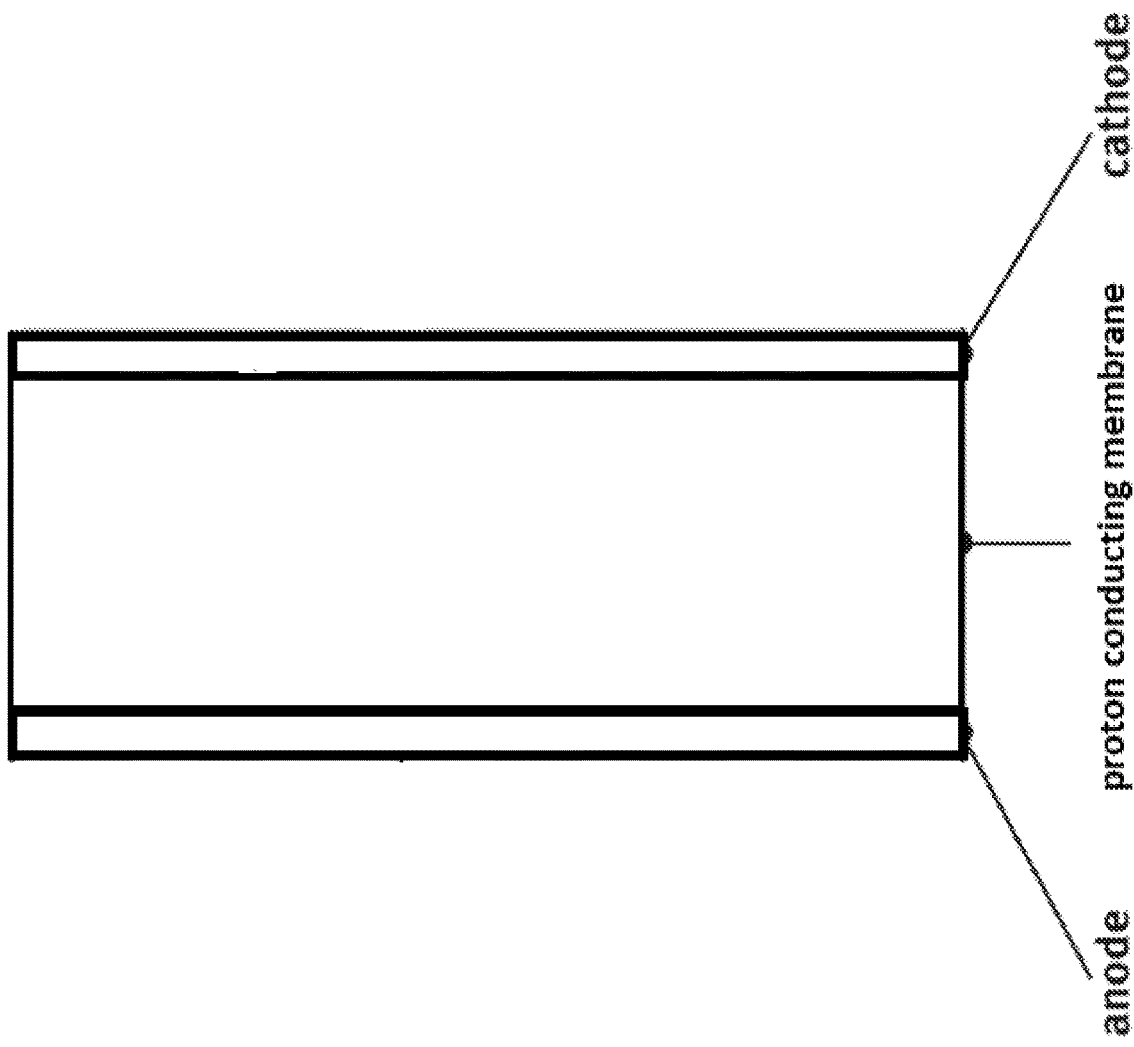
FIG. 1. Cross-sectional view of an electrochemical device incorporating a solid acid proton conducting membrane.

Proton conducting materials and membranes and electrochemical devices incorporating the materials and membranes are provided. Also provided are methods of making the materials and membranes and methods of operating the electrochemical devices.

The proton conducting materials are solid acids that form superprotonic phases at elevated temperatures. In addition, the solid acids are dense and thermally stable material that can form membranes that are impermeable to gasses and hydrocarbon fuels. As such, the proton conducting materials are suited for use in electrochemical devices, such as fuel cells. As used herein, the term superprotonic phase refers to a material phase having orientationally-disordered acidic oxyanion groups and high protonic conductivity. For the purposes of this disclosure, proton conductivities of $1 \times 10^{-4}$ S cm$^{-1}$ or greater are considered high protonic conductivities.

The solid acids have superprotonic phases with a cubic structure that can be represented by the general formula: $[M_{(1-x)}H_y]H_2PO_4$, where $0 < x \leq 0.2$ $\bar{2}$, wherein M represents one or more monovalent and/or divalent cations, such as metal cations or $NH_4^+$, and y is a number that provides charge balancing to the compound. The subscript (1−x) is the sum of the concentrations of the monovalent and divalent M cations. If all of the M cations in the compound represented by the general formula are monovalent, y=x. In these embodiments, the solid phase compound can be represented by the general formula: $[M_{(1-x)}H_x]H_2PO_4$, where $0 < x \leq 0.2$ $\bar{2}$, wherein M represents one or more monovalent cations and $0 < x \leq 0.2$ $\bar{2}$ (i.e., $0 < x \leq 2/9$). In some embodiments of the solid acids, $0.5 < x \leq 0.2$ $\bar{2}$. Examples of monovalent cations that can be used as the M component include alkali metals, such as cesium (Cs), lithium, (Li), sodium (Na), potassium (K), and rubidium (Rb), as well as $NH_4^+$, and combinations of two or more thereof. Examples of divalent cations that can be used include alkaline earth metal cations, such as barium (Ba) cations.

In some embodiments of the solid acids, M consists of only Cs, while in other embodiments M represents a mixture of Cs with one or more additional monovalent and/or divalent dopants, such as alkali metal cations and/or alkaline earth metal cations, wherein a portion of the Cs cations in the solid acid phase are substituted by the dopant cations. By way of illustration, a portion of the Cs cations can be substituted with Rb cations, K cations, and/or Ba cations. The dopant metal cation concentration will depend, at least in part, on the solubility of the particular dopant metal in the Cs. However, typical dopant metal cation concentrations, d, are in the range $0 < d \leq 20$ mol. %, including in the range from $1 < d \leq 10$ mol. %. The superprotonic phase may be present as a single-phase or as one phase in a mixed phase material. In the mixed phase materials, the one or more additional phases present may themselves form superprotonic phases at elevated temperatures. However, the additional phases need not form superprotonic phases, provided that the overall conductivity of the material is high. The elevated temperatures are temperatures greater than room temperature (~23° C.). Typically, these "elevated temperatures" are greater than about 80° C.; however the temperature at which the superprotonic phases are formed will depend on the particular solid acid being used, as illustrated in the Examples.

At least some embodiments of the solid acid phases are stable against dehydration in dry environments. As such, these solid acids are suited for use in proton conducting membranes for electrochemical devices, such as fuel cells, that can be operated without active hydration. This characteristic reduces the complexity and cost of fuel cells that utilize the proton conducting materials relative to fuel cells that require membrane humidification during operation. These embodiments include solids acid phases having rotationally disordered tetrahydroxyphosphonium cations ($H_4PO_4^+$) in the unit cell of their structure.

One example of a solid acid phase having a cubic structure that includes rotationally disordered tetrahydroxyphosphonium cations is represented by the formula $Cs_{0.78}H_{0.22}(H_2PO_4)$. This can also be written using the equivalent formula, showing an integer ratio of elements: $Cs_7H_2(H_2PO_4)_9$. Alternatively, this solid acid phase can be represented by the equivalent formula: $Cs_7(H_4PO_4)(H_2PO_4)_8$, which emphasizes the presence of the $H_4PO_4^+$ cations in the unit cell of the structure and is referred to herein as CPP. The CPP phase can be formed as a single, pure phase, or as one phase in a mixed phase material. For example, at elevated temperatures (e.g., temperatures in the range from 90° C. to 155° C.) the CPP phase can be formed in combination with CDP for $0<x\leq 0.2\overline{2}$. Other examples of solid acid phases having a cubic structure that includes rotationally disordered tetrahydroxyphosphonium cations include compounds that are isostructural with CPP in which dopant metal cations are substituted for a portion of the Cs cations.

Other embodiments of the solid acids have a superprotonic vacancy cubic (VC) structure in which cation vacancies are present in the unit cell due to an M cation deficiency in the phase stoichiometry. Single- or multi-phase materials that include a superprotonic VC phase at elevated temperatures above 155° C. can be formed for $[Cs_{(1-x)}H_x]H_2PO_4$, when $0<x\leq 0.18$. Other examples of solid acid phases having a superprotonic VC phase include compounds that are isostructural with the VC $[Cs_{(1-x)}H_x]H_2PO_4$ phase in which dopant metal cations are substituted for a portion of the Cs cations. The proton conductivities of embodiments of the vacancy cubic phase can be $10^{-3}$ S cm$^{-1}$ or higher. For example, proton conductivities in the range from $10^{-3}$ S cm$^{-1}$ to $10^{-2}$ S cm$^{-1}$ can be achieved.

The solid acids having the general formula $[M_{(1-x)}H_x]H_2PO_4$ can be made by reacting stoichiometric amounts of $MH_2PO_4$ and $MH_5(PO_4)_2$. For example, if M is Cs, the two reactants $CsH_2PO_4$ (CDP) and $CsH_5(PO_4)$ can be used. As used herein, the term stoichiometric amounts refers to the relative amounts of the reactants needed to produce the desired $[M_{(1-x)}H_x]H_2PO_4$ phase. For example, in order to form $Cs_7H_2(H_2PO_4)_9$, the CDP and $CsH_5(PO_4)_2$ would be used in a mole ratio of 5:2 in order to provide a Cs to P ratio of 7:9. The reaction can be carried out in the solid state at a temperature at or above a temperature at which the superprotonic phase is formed. Alternatively, the reaction can be carried out as a high temperature crystallization from an aqueous solution comprising stoichiometric amounts of the two reactants. As illustrated in the Example, the aqueous solution can be formed by forming a powder mixture of the two reactants and heating said mixture in a humidified atmosphere until the powders deliquesce to form a concentrated aqueous liquid solution. The concentrated aqueous liquid solution can then be heated to a temperature at which water from the solution evaporates and the solid acid phase crystallizes out of solution. By way of illustration, this crystallization temperature is typically in the range from about 100° C. to 150° C.

The solid acids can be used as proton conducting materials with or without a supporting matrix. If a supporting matrix is desired, particles of the solids acids can be embedded in a supporting matrix that acts as a binder and mechanical support. The matrix material can be non-conducting, can be one that conducts protons and/or electronics in order to enhance or tailor the conducting properties of the membrane, or can be a combination of one or more non-conducting materials with one or more conducting materials. Such composite membranes can be formed by mixing particles of the solid acid with the matrix material and pressing and/or heating the mixture into a solid composite membrane. Examples of non-conductive matrix materials include polymers, ceramics, and glasses. Examples of conductive matrix materials include metals, graphite, and conductive polymers. Specific examples of polymers include polyvinylidene fluoride, polydicyclopentadiene, polytetrafluoroethylene, polyetheretherketone, polyethersulfone, dimethyl siloxane polymers, polypyrrole, and polyaniline. Specific examples of ceramics include the inorganic oxides $SiO_2$, $Al_2O_3$, MgO, and cordierite. Specific examples of metals include gold, silver, copper, aluminum, nickel, iron, and zinc.

The proton conducting materials and membranes formed therefrom can be incorporated into a variety of devices that rely on the flow of protons for their operation. Such devices include, but are not limited to, fuel cells, electrochemical capacitors, and hydrogen separation membranes. Generally, the devices will include an anode and a cathode in electrical communication through the solid acid membrane/material. As illustrated in the cross-sectional view of FIG. 1, typically, the proton conducting solid acid material or membrane will be positioned at least partially between the anode and the cathode. The devices can be operated at temperatures at or above the temperature at which a superprotonic phase of the solid acid is formed and below the temperature at which a solid acid phase thermally decomposes and/or melts. Typical operating temperatures include those in the range from about 90° C. to about 250° C.; however, the optimal operating temperatures will depend upon the specific solid acid phase being used. The transition into a superprotonic phase can be sharp or gradual and is characterized by marked increase in conductivity, usually by one or more orders of magnitude.

Figure 2:
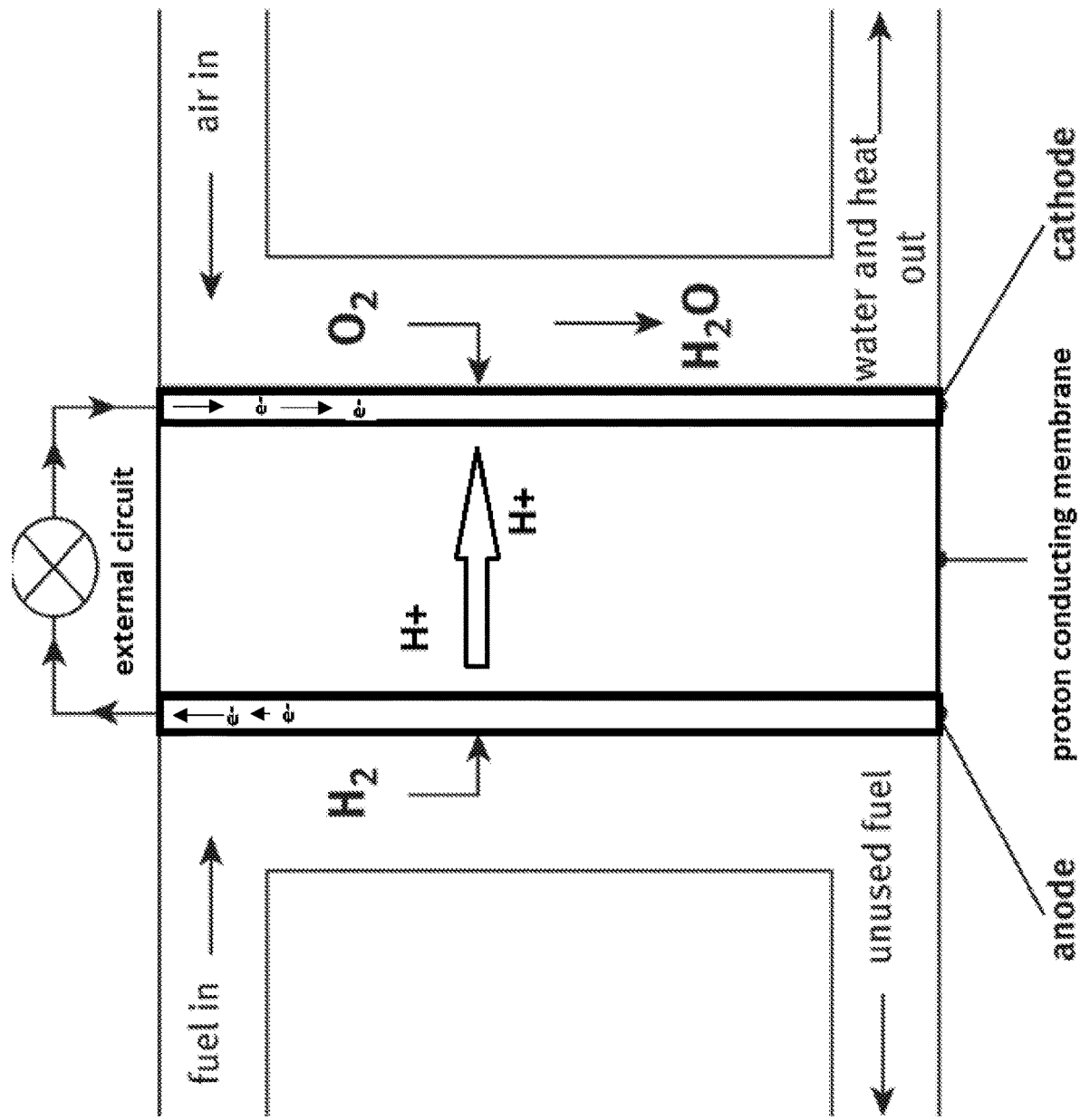
FIG. 2. Cross-sectional view of a fuel cell incorporating a solid acid proton conducting membrane.

One example of a fuel cell incorporating a proton conducting membrane comprising a solid acid, as described herein, is shown schematically in FIG. 2. During operation, a fuel is fed into the anode where it is oxidized to form e− (electrons) and H$^+$ (protons). The fuel may be hydrogen (H$_2$) or an organic compound that serves as a hydrogen source, such as methane, methanol, or gasoline. The electrons pass externally through an external wire of circuit to the cathode, while the protons travel to the cathode through the proton conducting membrane. An oxidizing agent, typically oxygen in air, is fed into the cathode, where it reacts with the H$^+$ and electrons to form water. In the fuel cell, the anode comprises a catalyst for the oxidation of a fuel (e.g., the splitting of H$_2$ into protons and electrons), and the cathode comprises a catalyst for the reduction of the oxidizing agent. Platinum is an example of an electrode material that can be used as the anode and the cathode. For embodiments of the membranes that need not be hydrated during operation, the fuel cell construction is less complex than fuel cells using membranes that require humidification.

Figure 3:
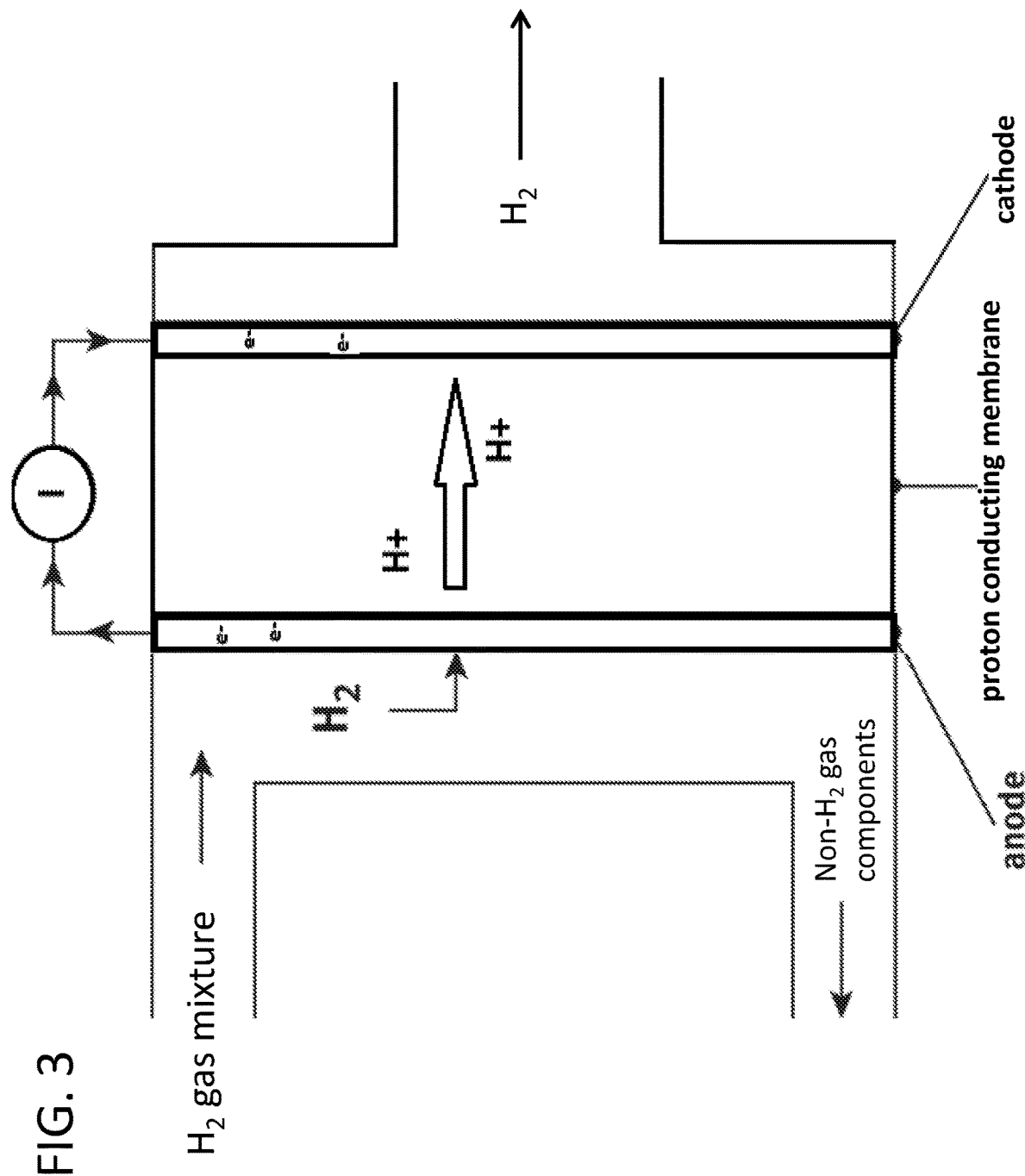
FIG. 3. Cross-sectional view of a hydrogen separation device incorporating a solid acid proton conducting membrane.

One example of a hydrogen separation device is shown schematically in FIG. 3. In this device, the proton conducting membrane is sandwiched between an anode and a cathode that are connected through a current source. A gas mixture containing hydrogen gas and other unwanted gases, such as carbon monoxide and/or carbon dioxide, is fed into the anode side of the proton conducting membrane. The application of a current across the membrane causes the hydrogen gas to dissociate into H$^+$ and e−. The proton conducting membrane selectively passes the protons, discriminating against other species in the gas mixture, while the electrons pass through the current source to the cathode side of the proton conducting membrane, where they recombine with the H$^+$ to reform hydrogen gas.

EXAMPLES

Example 1: CPP

This example describes the synthesis and characterization of the new superprotonic compound: heptacesium tetrahydroxyphosphonium octa-dihydrogenphosphate, $Cs_7(H_4PO_4)(H_2PO_4)_8$, or CPP. As described below, CPP is thermodynamically stable at temperatures as high as 151° C. even without humidification and can be produced by either solid state reaction or high temperature crystallization from aqueous solution. The structure of $Cs_7(H_4PO_4)(H_2PO_4)_8$ is rather remarkable in that it contains the tetra-hydroxyphosphonium cation, $H_4PO_4^+$. This polycation is an exceptionally rare species, especially in crystalline solids.

Crystal Synthesis and Structure Determination Methods

Stoichiometric mixtures of CDP and $CsH_5(PO_4)_2$ (5:2 molar ratio) were homogenized by grinding, pressed into dense compacts at 275 MPa, and annealed at 130° C. for 3 days under dry $N_2$ gas flow. All subsequent references to powder precursor samples are to materials prepared in this way.

Crystals of $Cs_7(H_4PO_4)(H_2PO_4)_8$ were grown for single crystal x-ray diffraction (XRD) from the powder precursor samples using a high temperature deliquescence and crystallization procedure. Approximately 1 g of the powder sample of CDP and $CsH_5(PO_4)_2$ was heated to 102° C. in a tube furnace. A highly humidified gas stream ($pH_2O$=~0.93 atm) was then supplied to the sample, achieved by bubbling 40 sccm (standard cubic cm per min) Ar through 98° C. water. The sample was held under this condition for 6 h to achieve complete deliquescence, forming a concentrated liquid solution. The temperature was then slowly increased to 130° C. in 5° C. steps with a 2 h hold at each step, while maintaining the humidified atmosphere. The water gradually evaporated and the target phase crystallized. During diffraction measurements, the selected crystal was preserved by a flow of argon heated to 130° C.

Single crystal XRD data for structure solution were collected using Mo Kα radiation (λ=0.71073 Å) on a Bruker Kappa APEX with a CCD (charge-coupled device) area detector. Absorption corrections were applied using SAD-ABS-2016/2. A total of 9772 reflections were captured, from which a cubic unit cell with a=20.1994(9) Å was established. The space group was determined as Pm $\bar{3}$ n using Xprep (SHELX). (Sheldrick, G. M. *Acta Crystallogr. Sect. A Found. Crystallogr.* 2008, 64 (1), 112-122. https://doi.org/10.1107/S0108767307043930.) The formula unit was defined as 7 cesium atoms, 9 phosphorus atoms, and 36 oxygen atoms, with 8 formula units per unit cell, where the protons have been left out of the structure refinement.

Figure 4A:
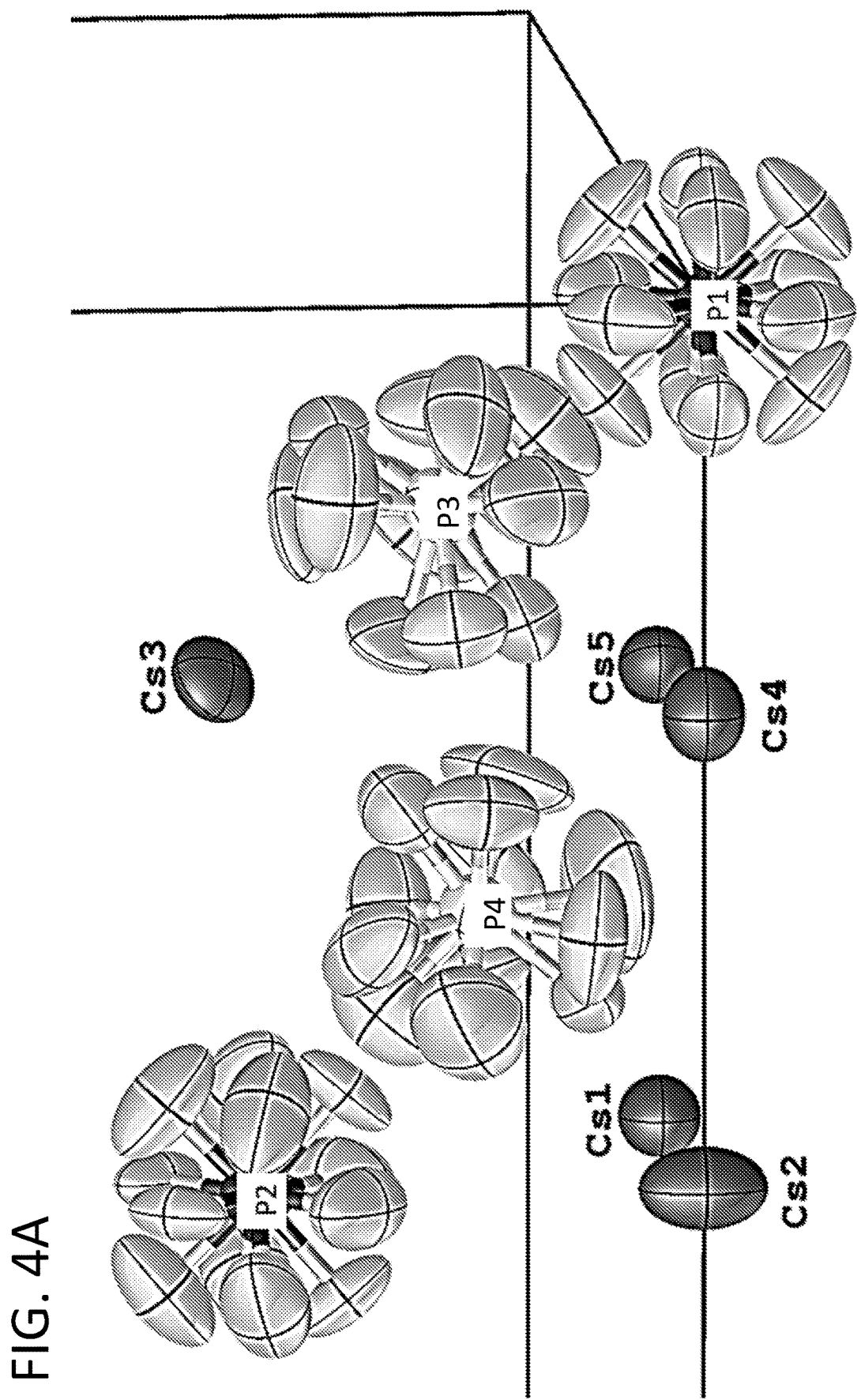
FIGS. 4A-4D. Crystal structure of $Cs_7(H_4PO_4)(H_2PO_4)_8$.
Figure 4B:
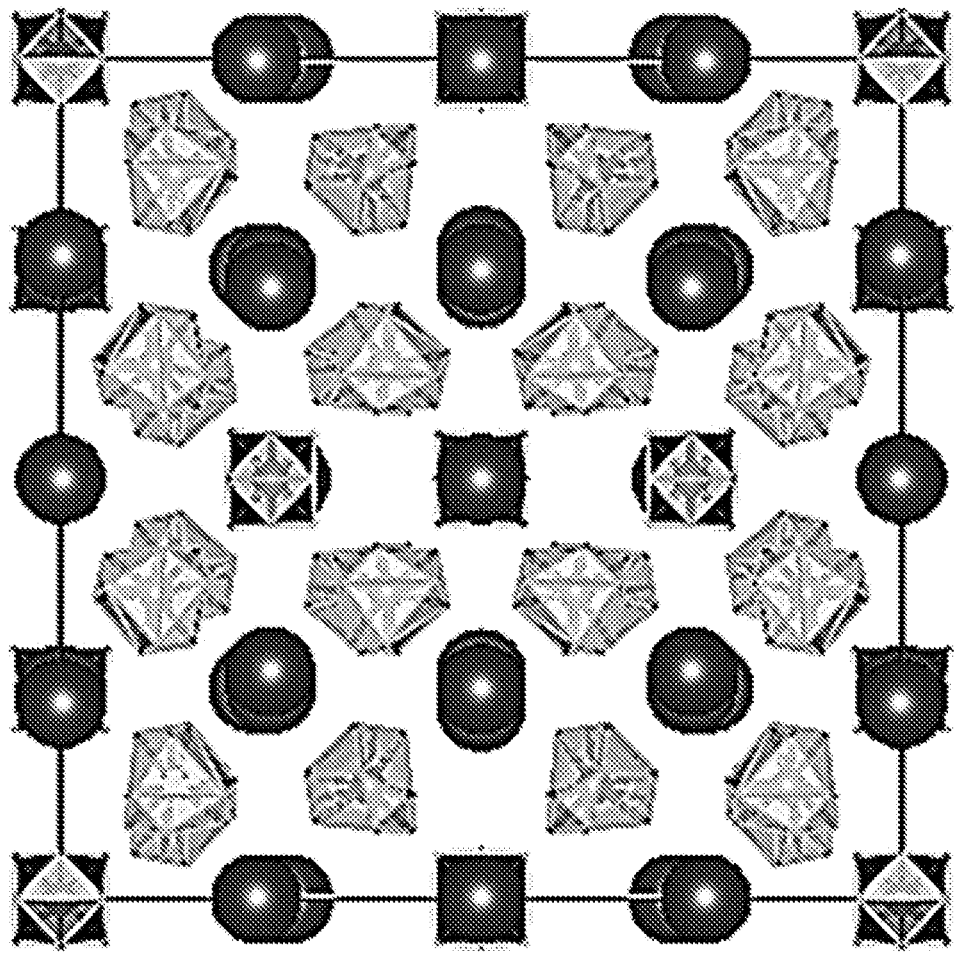
Figure 4C:
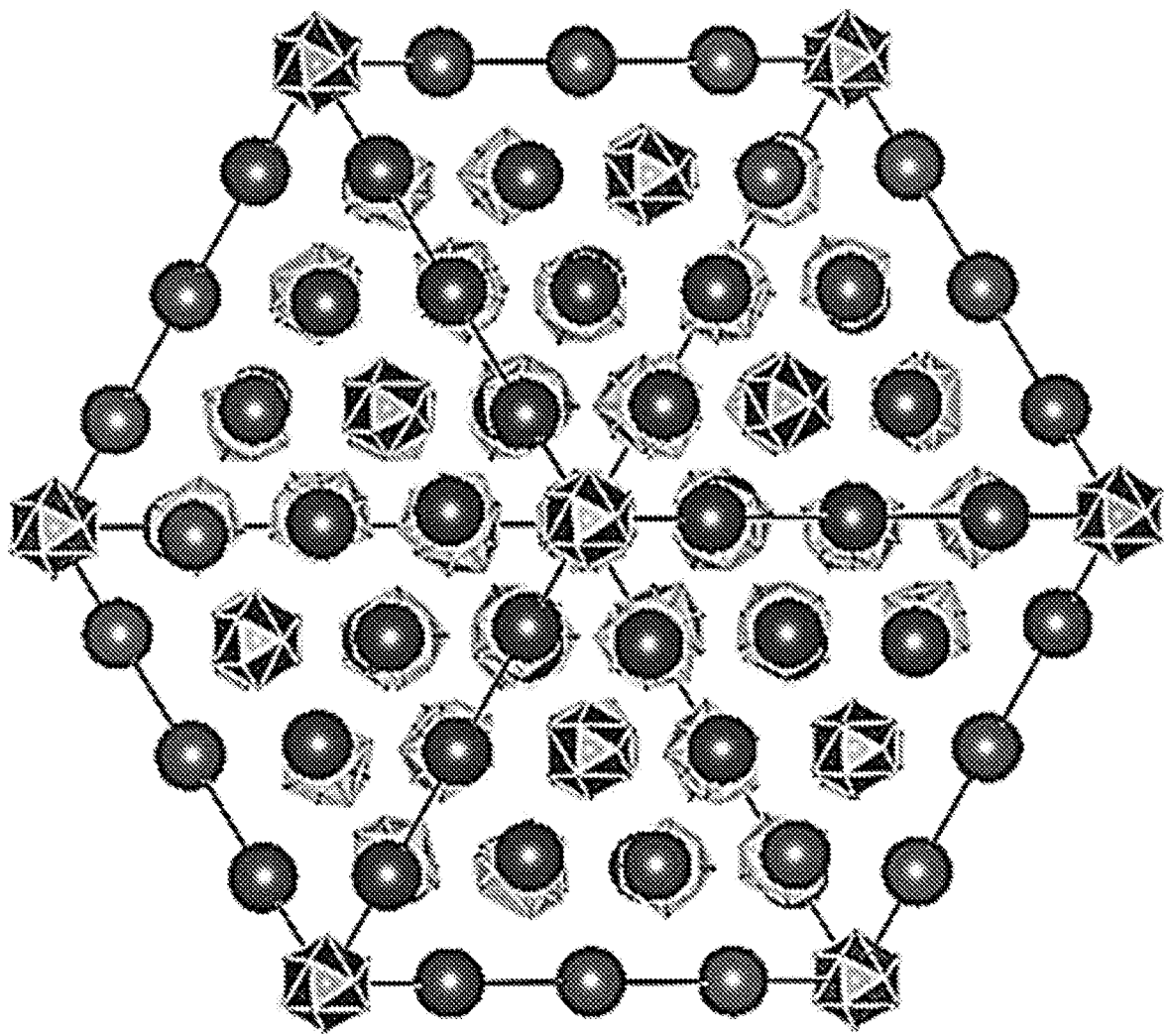
Figure 4D:
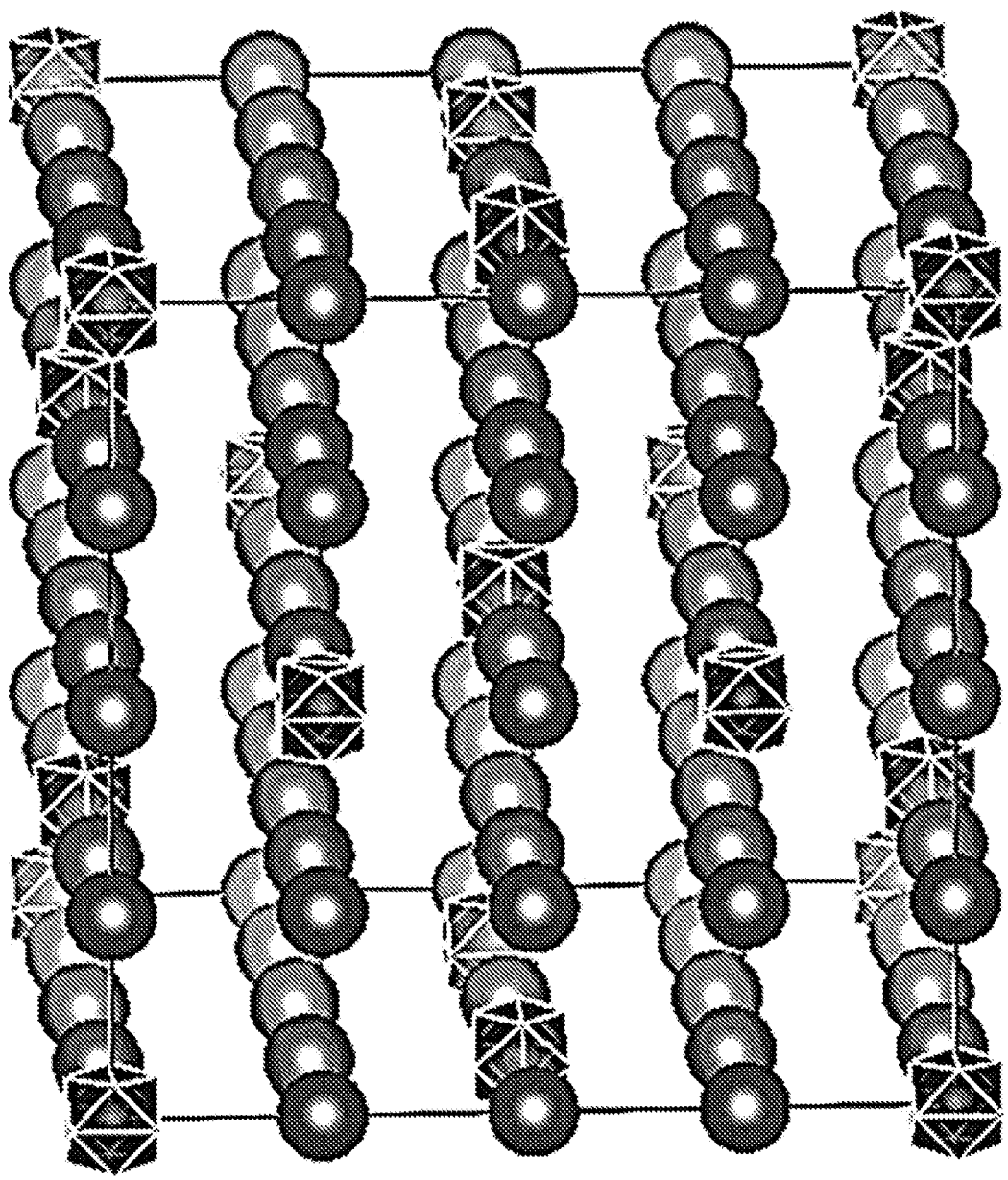

The structure of CPP was solved by direct methods (SHELXS) and refined by least squares minimization (SHELXL). The crystal structure of the phase is presented in FIGS. 4A and 4B.

Results: Structure of $Cs_7(H_4PO_4)(H_2PO_4)_8$

The cubic structure adopted by $Cs_7(H_4PO_4)(H_2PO_4)_8$ (FIGS. 4A-4B, Table 1) bears significant similarities to that of superprotonic CDP. Like the latter, CPP has a CsCl-like structure with orientationally disordered $H_2PO_4^-$ groups residing on the anion sites. In contrast to CDP, however, one of every eight cation sites of the CsCl substructure is occupied by an orientationally disordered $PO_4$ group. These $PO_4$ groups are identified as polycations of chemistry $H_4PO_4^+$, a conclusion that was supported by NMR studies. The asymmetric unit was found to contain five Cs cations, two $H_4PO_4^+$ cations, and two $H_2PO_4^-$ anions.

TABLE 1

Structure of $Cs_7(H_4PO_4)(H_2PO_4)_8$ with atomic positions, site occupancy, and anisotropic thermal displacement parameters.

| Atom | x | y | z | occupancy | U11 | U22 |
|---|---|---|---|---|---|---|
| Cs1 | 0.25 | 0.5 | 0 | 1 | 0.1011(9) | 0.0901(5) |
| Cs2 | 0 | 0.5 | 0 | 1 | 0.0835(9) | 0.0945(9) |
| Cs3 | 0.25 | 0.25 | 0.25 | 1 | 0.0953(4) | 0.0953(4) |
| Cs4 | 0 | 0.23261(6) | 0 | 1 | 0.0848(6) | 0.1224(8) |
| Cs5 | 0.27088(4) | 0.24886(3) | 0 | 1 | 0.1048(6) | 0.0867(5) |
| P1 | 0 | 0 | 0 | 1 | 0.0492(12) | 0.0492(12) |
| P2 | 0.5 | 0.25 | 0 | 1 | 0.0634(14) | 0.071(2) |
| P3 | 0.13502(8) | 0.13502(8) | 0.13502(8) | 1 | 0.0759(7) | 0.0759(7) |
| P4 | 0.13421(9) | 0.36442(9) | 0.11283(9) | 1 | 0.0772(10) | 0.0795(11) |
| O1 | −0.0517(12) | 0.0557(11) | 0 | 1/3 | 0.147(17) | 0.119(16) |
| O2 | 0.086(3) | 0.077(2) | 0.1237(8) | 1/3 | 0.17(2) | 0.17(3) |
| O3 | 0.1974(9) | 0.0903(9) | 0.1222(18) | 1/3 | 0.107(13) | 0.087(12) |
| O4 | 0.1974(7) | 0.1299(13) | 0.0906(7) | 1/3 | 0.088(10) | 0.150(16) |
| O5 | 0.2086(6) | 0.1540(14) | 0.1397(14) | 1/3 | 0.078(10) | 0.22(3) |
| O6 | 0.0902(7) | 0.3012(6) | 0.1155(13) | 1/3 | 0.070(9) | 0.078(9) |
| O7 | 0.1178(11) | 0.3028(7) | 0.1576(8) | 1/3 | 0.145(17) | 0.103(12) |
| O8 | 0.1488(14) | 0.2922(6) | 0.0952(13) | 1/3 | 0.26(3) | 0.067(10) |
| O9 | 0.1979(8) | 0.3720(15) | 0.1563(8) | 1/3 | 0.105(12) | 0.20(2) |
| O10 | 0.1981(8) | 0.4078(10) | 0.1141(17) | 1/3 | 0.101(12) | 0.116(15) |
| O11 | 0.2080(5) | 0.3480(10) | 0.1004(12) | 1/3 | 0.050(7) | 0.154(17) |
| O12 | 0.1242(9) | 0.4182(13) | 0.1647(13) | 1/3 | 0.090(13) | 0.156(19) |
| O13 | 0.0952(14) | 0.3781(11) | 0.1767(9) | 1/3 | 0.17(2) | 0.138(18) |
| O14 | 0.0799(15) | 0.4181(15) | 0.1234(13) | 1/3 | 0.24(3) | 0.21(3) |
| O15 | 0.1214(13) | 0.4109(7) | 0.0529(7) | 1/3 | 0.172(19) | 0.074(9) |
| O16 | 0.0869(7) | 0.3724(17) | 0.0529(7) | 1/3 | 0.068(9) | 0.25(3) |
| O17 | 0.150(2) | 0.357(2) | 0.0391(8) | 1/3 | 0.40(6) | 0.39(6) |
| O18 | 0.4420(8) | 0.2005(9) | 0 | 1/3 | 0.091(11) | 0.118(13) |
| O19 | 0.5532(11) | 0.3020(11) | 0 | 1/3 | 0.18(2) | 0.145(19) |
| O20 | 0.4463(5) | 0.25 | −0.0537(5) | 1/3 | 0.183(17) | 0.119(18) |

| Atom | U33 | U23 | U13 | U12 |
|---|---|---|---|---|
| Cs1 | 0.0901(5) | 0 | 0 | 0 |
| Cs2 | 0.222(2) | 0 | 0 | 0 |
| Cs3 | 0.0953(4) | −0.0204(3) | −0.0204(3) | −0.0204(3) |

TABLE 1-continued

Structure of $Cs_7(H_4PO_4)(H_2PO_4)_8$ with atomic positions, site occupancy, and anisotropic thermal displacement parameters.

| | | | | |
|---|---|---|---|---|
| Cs4 | 0.0913(7) | 0 | 0 | 0 |
| Cs5 | 0.0765(4) | 0 | 0 | 0.0200(3) |
| P1 | 0.0492(12) | 0 | 0 | 0 |
| P2 | 0.0634(14) | 0 | 0 | 0 |
| P3 | 0.0759(7) | −0.0134(7) | −0.0134(7) | −0.0134(7) |
| P4 | 0.0782(10) | −0.0084(8) | 0.0113(8) | 0.0056(7) |
| O1 | 0.068(9) | 0 | 0 | 0.091(11) |
| O2 | 0.108(13) | −0.002(19) | −0.02(2) | −0.097(15) |
| O3 | 0.30(4) | 0.002(18) | 0.017(19) | −0.009(11) |
| O4 | 0.065(8) | 0.006(10) | 0.006(7) | 0.009(12) |
| O5 | 0.23(3) | −0.146(18) | −0.005(13) | −0.041(13) |
| O6 | 0.186(19) | −0.011(11) | −0.015(11) | −0.005(7) |
| O7 | 0.098(12) | −0.011(9) | 0.016(11) | −0.017(12) |
| O8 | 0.22(2) | −0.037(12) | 0.12(2) | 0.007(13) |
| O9 | 0.100(13) | −0.006(15) | −0.002(10) | −0.037(14) |
| O10 | 0.24(3) | 0.040(19) | −0.001(16) | −0.001(11) |
| O11 | 0.180(19) | −0.099(14) | 0.011(8) | 0.014(8) |
| O12 | 0.16(2) | −0.046(16) | 0.047(12) | −0.028(12) |
| O13 | 0.114(14) | 0.052(12) | 0.062(14) | 0.054(16) |
| O14 | 0.19(3) | −0.03(2) | −0.05(2) | 0.09(3) |
| O15 | 0.073(9) | 0.000(7) | 0.018(11) | 0.016(10) |
| O16 | 0.066(9) | 0.019(14) | 0.000(7) | 0.002(13) |
| O17 | 0.096(15) | −0.03(2) | 0.10(2) | 0.08(4) |
| O18 | 0.041(7) | 0 | 0 | −0.066(10) |
| O19 | 0.091(14) | 0 | 0 | −0.089(18) |
| O20 | 0.183(17) | −0.036(14) | −0.10(2) | 0.036(14) |

Phase Formation and Stability Range
Methods

The high temperature phase behavior of CPP was investigated using high temperature x-ray powder diffraction (HTXRD) under both ambient air and active humidification. Samples were prepared by pressing precursor powders of CDP and $CsH_5(PO_4)_2$ (5:2 molar ratio) into thin compacts (~0.1 mm thick, 57 MPA) in order to enhance inter-particle contact and facilitate solid state reaction. A Rigaku Smart-Lab Gen 3 9 kW instrument (CuKα, 45 kV, 160 mA) equipped with an Anton Paar XRK900 furnace was used for data collection under ambient air. HTXRD measurements under controlled humidity were performed using an in-house constructed stage, mounted on a Rigaku Ultima diffractometer (CuKα, 40 kV, 44 mA). The sample was exposed to a humidified atmosphere ($pH_2O$=0.4 atm) at temperatures above 130° C. Humidification was introduced only at temperatures above 130° C. in order to prevent condensation of water vapor in the stage.

The thermodynamic properties of CPP were studied by simultaneous thermogravimetric analysis (TGA) and differential scanning calorimetry (DSC) using a Netzsch STA F3 equipped with a water vapor generator. Measurements were performed under nominally dry Ar and under seven different $H_2O$ partial pressures of between 0.05 and 0.6 atm using Ar as a carrier gas. Ground powder samples (50-60 mg) were loaded into a Pt pan and heated at a rate of 1° C./min. For measurements under humidified atmospheres, the sample was heated to 130° C. and held for 2 hours before water vapor was introduced. Again, humidification was applied only at 130° C. and higher so as to avoid water condensation.

Results: Thermodynamics of CPP Formation

Figure 5:
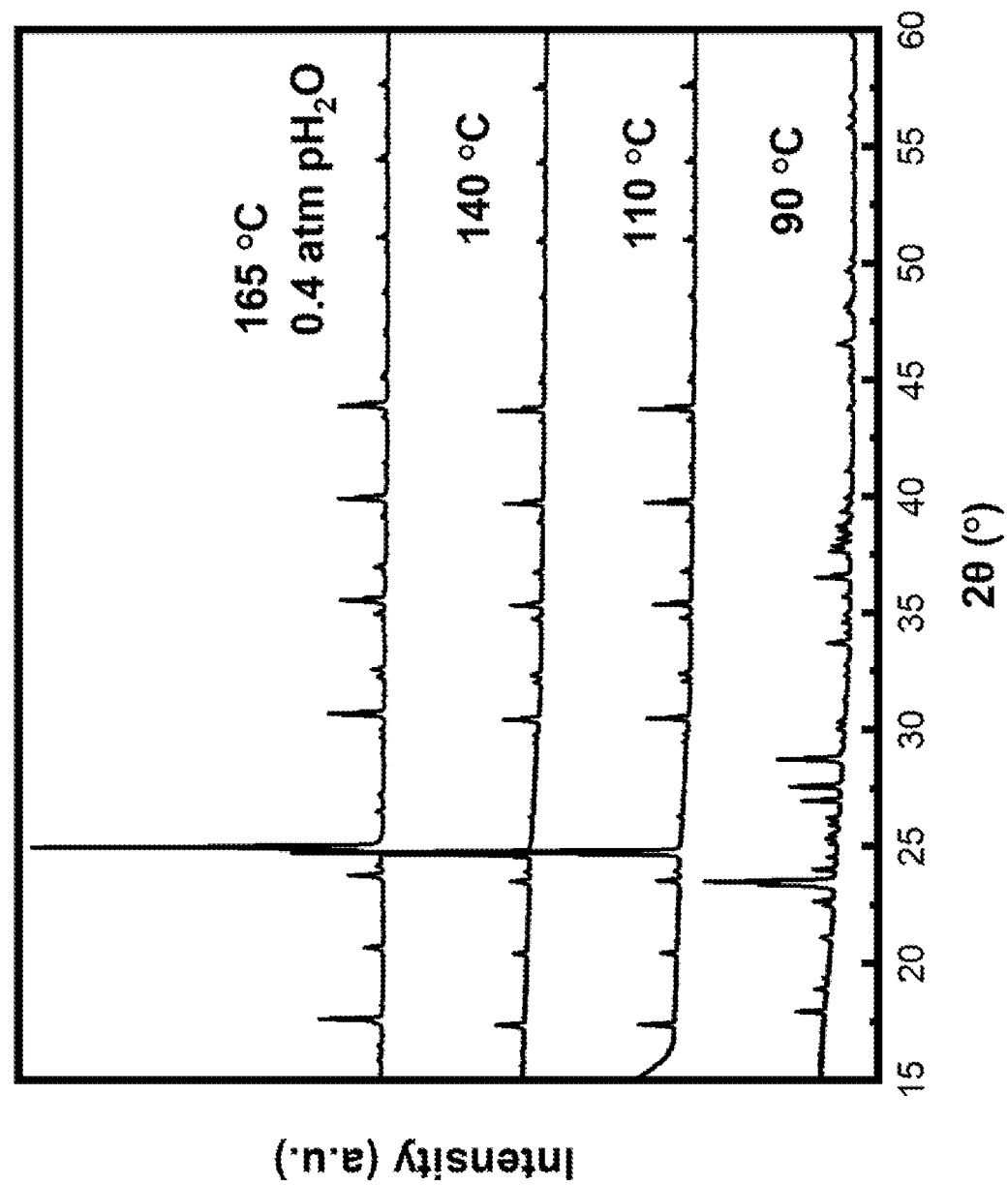
FIG. 5. Powder x-ray diffraction patterns collected at 90, 110, and 140° C. under ambient atmosphere, and at 165° C. under 0.4 atm $pH_2O$. The pattern collected at 90° C. is a superposition of the patterns of the monoclinic phases of $CsH_2PO_4$ and $CsH_5(PO_4)_2$. Patterns at 110, 140, and 165° C. are fully indexed to cubic $Cs_7(H_4PO_4)(H_2PO_4)_8$.

The HTXRD data (FIG. 5) and thermal analysis results (FIG. 6) reveal that CDP and $CsH_5(PO_4)_2$ react at elevated temperatures to form CPP. Specifically, the diffraction data show retention of the two reactant phases at 90° C., whereas at 110° C. only CPP is observed. The DSC profile reveals that this structural change is accompanied by a distinct thermal event that initiates at 90° C. (and completes by ~110° C.). Notably, no weight loss is observed during the DSC transition, consistent with a solid state transformation. The temperature ($T_{rxn}$), enthalpy ($\Delta_{rxn}H$), and entropy ($\Delta_{rxn}S=\Delta_{rxn}H/T_{rxn}$), of the reaction were found to be 89.5±1.2° C., 47±5 kJ/mol, and 130±14 J/mol-K, respectively, as averaged over 8 measurements.

Figure 6:
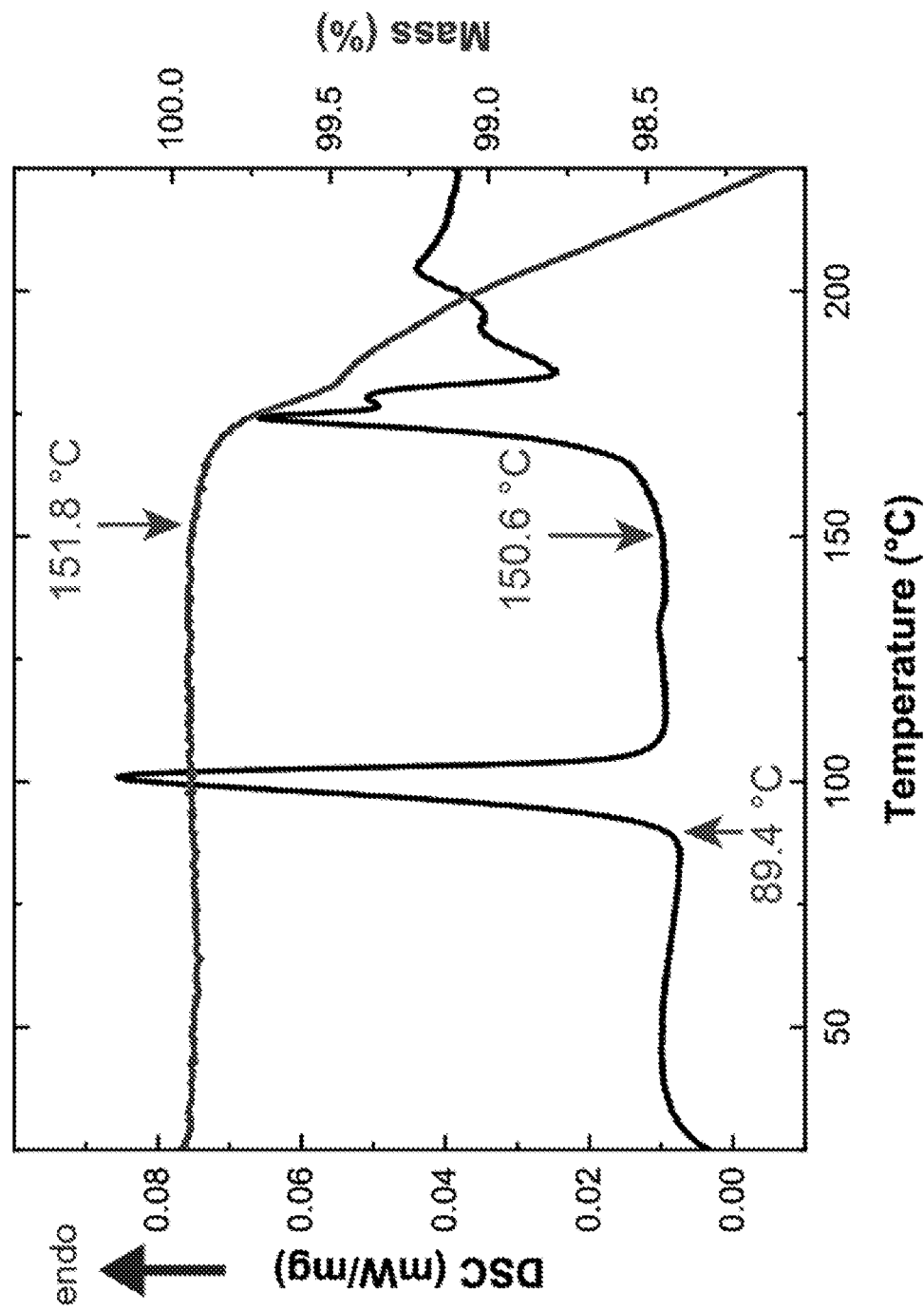
FIG. 6. Differential scanning calorimetry and thermogravimetric profiles collected from a 5:2 $CDP:CsH_5(PO_4)_2$ sample heated at 1° C./min under flowing dry Ar. Here, the DSC peaks for superprotonic reaction (90° C.) and decomposition (151° C.) frame the stability window of $Cs_7(H_4PO_4)(H_2PO_4)_8$ under nominally dry conditions.

Further heating beyond the reaction temperature resulted in conventional thermal expansion of the CPP crystal structure. Retention of CPP was observed in the diffraction data collected in the absence of active humidification up to 140° C., FIG. 5, and the onset of CPP decomposition at 151° C. was evident in coincident mass loss and endothermic events (FIG. 6). Thus, CPP is stable over a large temperature window (90-151° C.) in nominally dry conditions. This stands in marked contrast to CDP, the only other compound with a superprotonic phase composed of oxyanions that are solely $PO_4$ groups, which has a superprotonic phase with a negligible window of stability under dry conditions.

Figure 7:
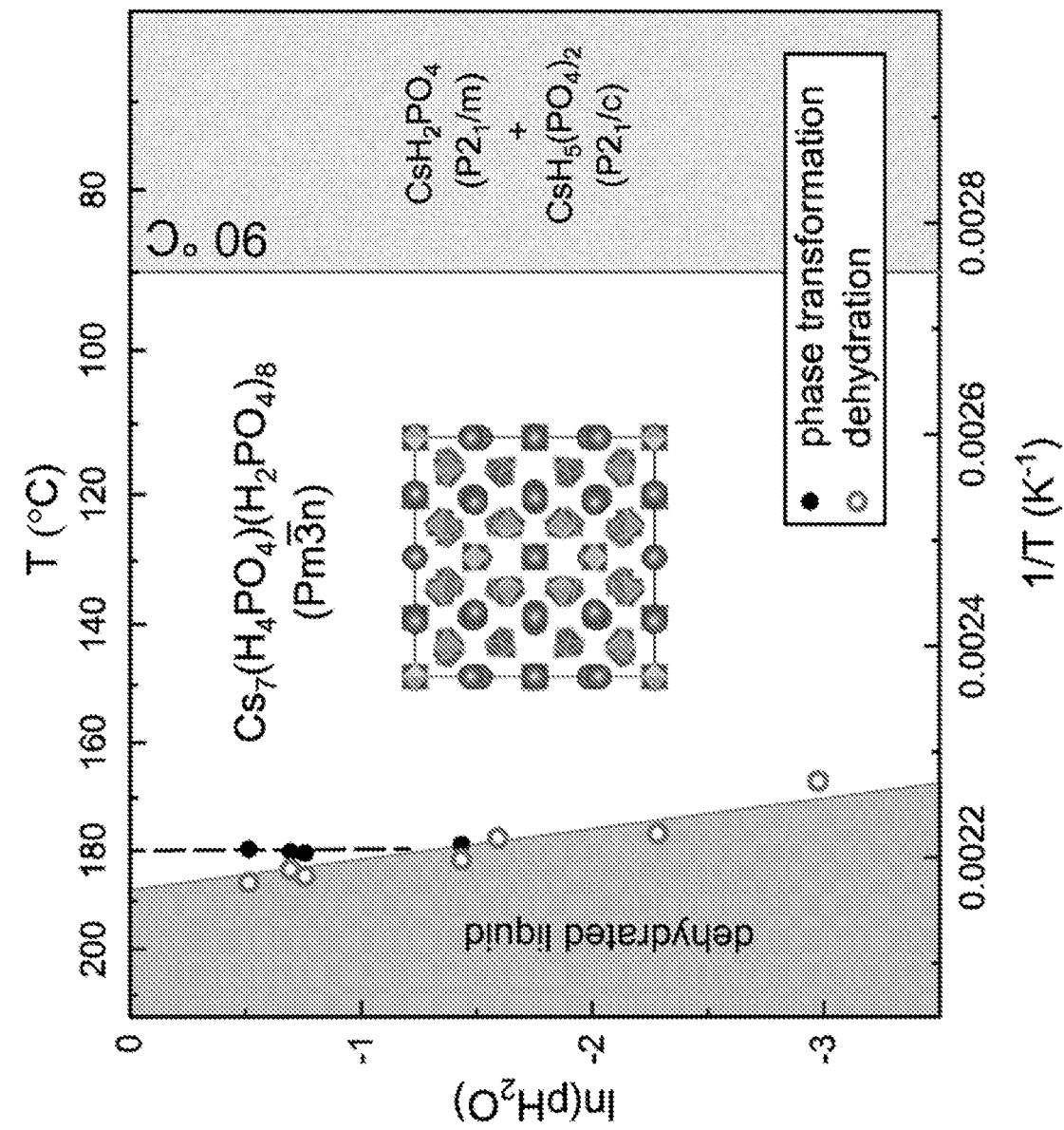
FIG. 7. Phase diagram for $Cs_7(H_4PO_4)(H_2PO_4)_8$. Dehydration temperatures are identified according to the onset of mass loss detected in the dTG profile. Phase transformation temperatures are identified according to the onset of the sharp DSC signal, limited to measurements with $pH_2O$ 0.24 atm.

Active humidification resulted in suppression of the dehydration mass loss reaction, as evidenced in the differential mass loss curves. Diffraction data collected at 165° C. under 0.4 atm $pH_2O$, FIG. 5, confirmed retention of the cubic CPP phase to this higher temperature. Close examination of the DSC curves reveals that those collected with $pH_2O$≤0.5 atm are characterized by two overlapping thermal anomalies in the vicinity of the onset of mass loss. The first produces a sharp DSC peak at an onset temperature of 180° C. and corresponds to a solid-state phase transition to a vacancy cubic phase, discussed in Example 2, below. The second event is a broad peak that coincides with the broad peak in the dTG curves and corresponds to the dehydration of the material. Based on these results, a proposed phase stability diagram for $Cs_7(H_4PO_4)(H_2PO_4)_8$ is presented in FIG. 7.

Conductivity
Methods

Conductivity measurements were made by A.C. impedance spectroscopy using an Agilent 4284A LCR analyzer. Data were collected using a 20 mV amplitude (under zero bias) over a $10^5$-20 Hz frequency range. A dense compact, 1 mm in thickness, was prepared by pressing mixed powders of CDP and $CsH_5(PO_4)_2$ (5:2 molar ratio) in a 15 mm die to achieve 93% theoretical density. Electrodes were applied by sputtering 100 nm of Ag on each side. Data were collected under flowing $N_2$ (40 sccm) over the temperature range 60-170° C. At temperatures of 140° C. and higher, the supply gas was humidified by bubbling through a water bath at 80° C. to achieve $pH_2O$=0.4 atm. The sample was heated at a rate of 2° C./min in 5-10° C. increments and was held at temperature for 30 minutes prior to measurement. Impedance spectra were analyzed using the commercial software package Zview.

Results

Figure 8:
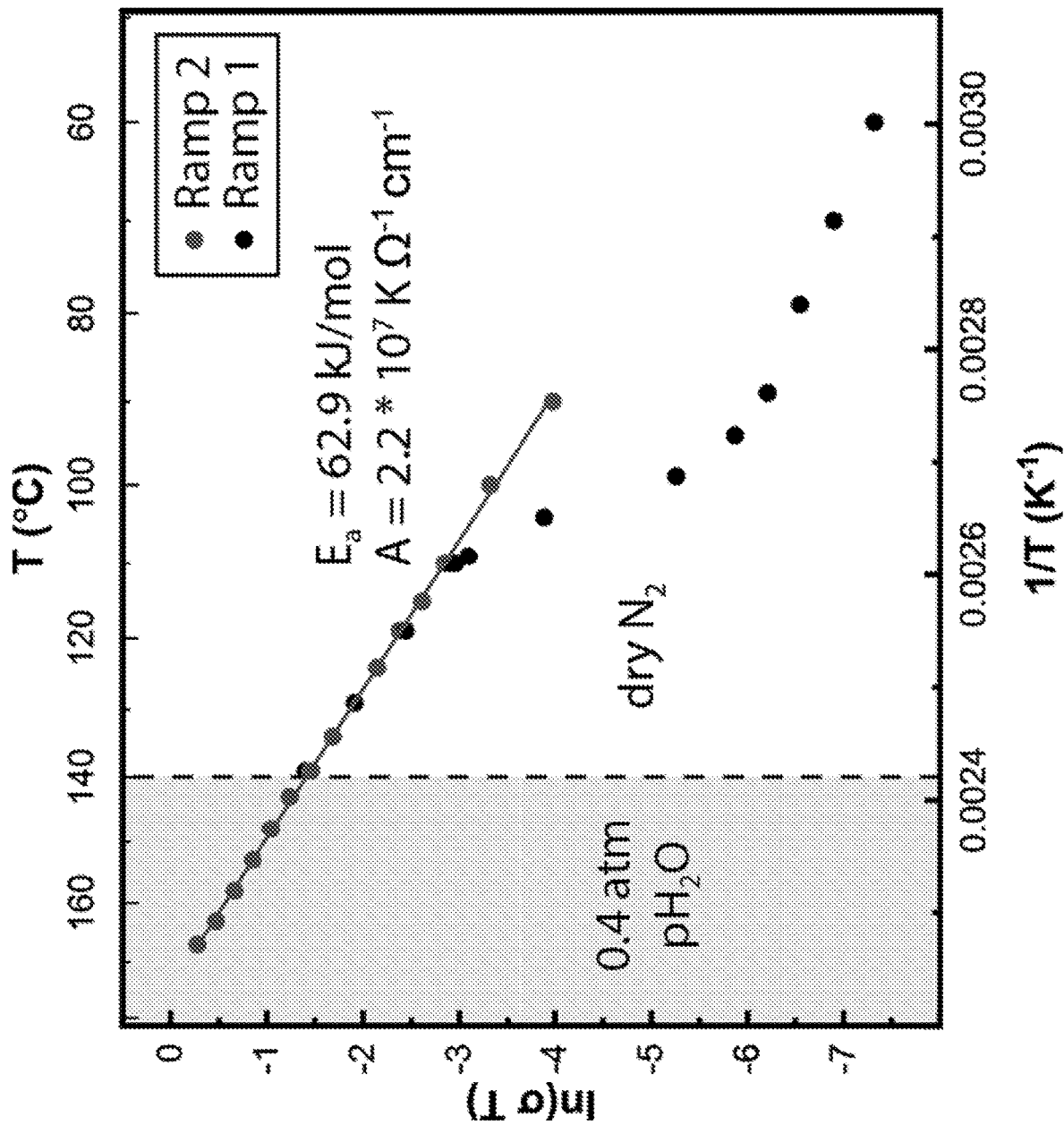
FIG. 8. Conductivity of $Cs_7(H_4PO_4)(H_2PO_4)_8$ as measured over two successive heating cycles and plotted in Arrhenius form. The solid line is a fit to the measured data, from which the activation energy and pre-exponential factor for proton transport in $Cs_7(H_4PO_4)(H_2PO_4)_8$ were determined.

The conductivity values as measured in two successive heating cycles are plotted in Arrhenius form in FIG. 8. In the first heating cycle, a dramatic increase in conductivity between 90 and 110° C. due to the formation of superprotonic CPP is evident, with the conductivity rising in this narrow temperature regime by about three orders of magnitude. Following the formation of the CPP phase, the conductivity is linear in the Arrhenius representation, with an activation energy for charge transport of 0.652(4) eV (62.9(4) kJ/mol). Introduction of humidification during the $2^{nd}$ heating cycle had no impact on the magnitude of the conductivity, but acted to prevent dehydration and enabled measurement to ~170° C.

Conclusion and Summary

The structure, thermodynamic and proton transport properties of superprotonic $Cs_7(H_4PO_4)(H_2PO_4)_8$ (CPP), a new compound, are presented in this example. The compound forms at 90° C. from reaction of CDP and $CsH_5(PO_4)_2$. Single crystal diffraction studies revealed rotationally disordered $H_4PO_4^+$ polycations as periodic features on the cation lattice—replacing Cs on one of every eight cation sites. The regular, periodic placement of the $H_4PO_4^+$ cations reduces the symmetry of the cubic structure to $Pm\overline{3}n$ from the ideal $Pm\overline{3}m$ space group of the CsCl structure type and creates a 4×4×4 supercell of cubic CDP-like unit cells. CPP is stable against dehydration even in dry atmospheres up to 151° C., which can be extended to higher temperatures through active humidification. This phase behavior stands in contrast to that of CDP, the only other superprotonic solid acid formed of entirely phosphate polyanion groups, which has a negligible window of stability in the superprotonic phase under nominally dry conditions.

Example 2: Cs-Based Superprotonic VC Phases

This example describes the synthesis and characterization of compounds of composition $[Cs_{1-x}H_x]H_2PO_4$, where 0<x<2/9, which form a superprotonic cubic structure with cation site vacancies at temperature above 155° C.

Sample of $[Cs_{1-x}H_x]H_2PO_4$, where 0<x<2/9, were synthesized by grinding stoichiometric amounts of $CsH_2PO_4$ and $CsH_5(PO_4)_2$ powders.

Methods: High Temperature Phase Behavior. The high temperature phase behavior of these samples was characterized using the home-built stage mounted on the Rigaku Ultima, as described in Example 1. A humidified $N_2$ stream (0.4 atm $pH_2O$) was introduced into the sample chamber at temperatures above 130° C.

Figure 9:
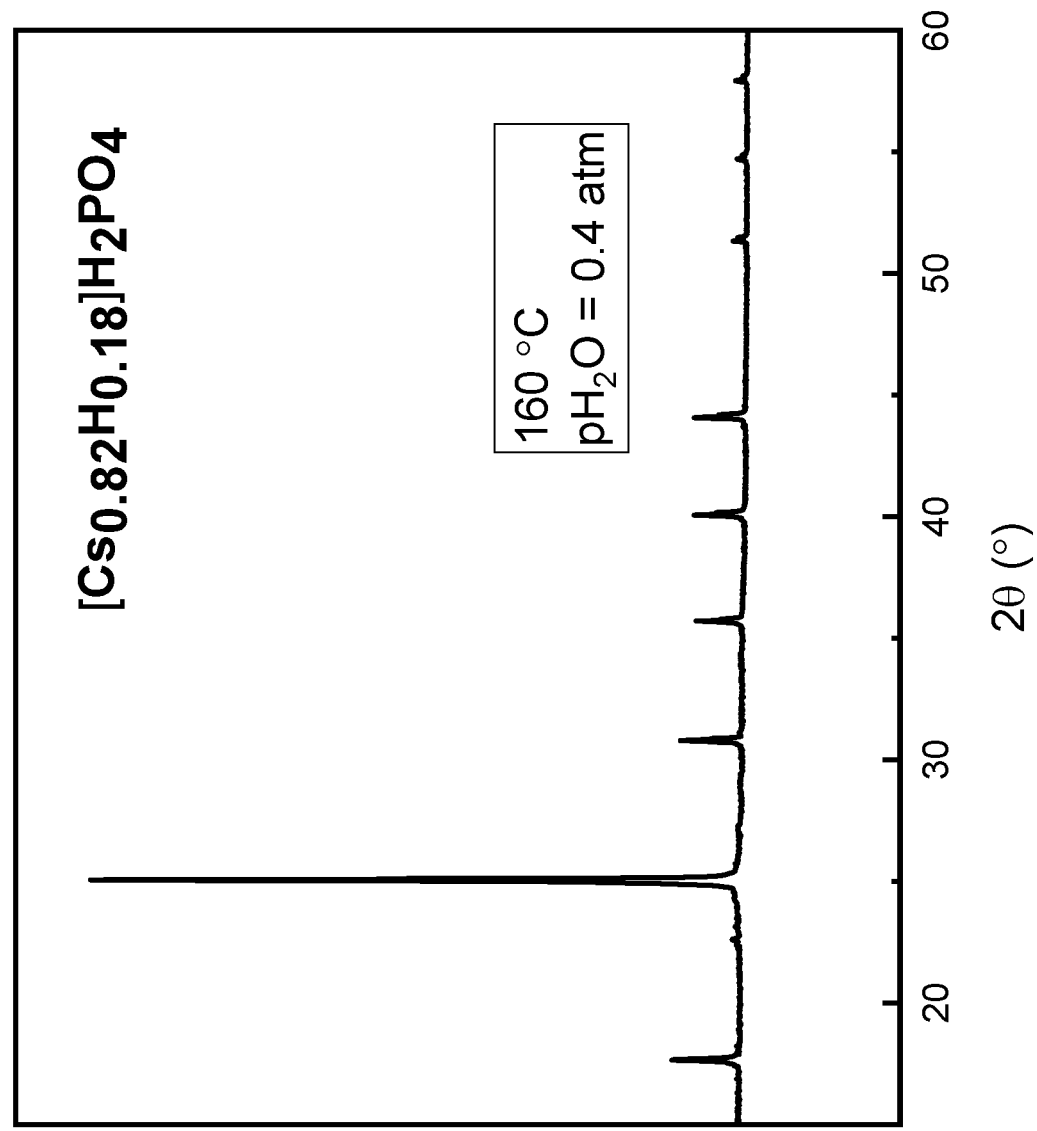
FIG. 9. X-ray diffraction pattern of the vacancy cubic phase of composition x=0.18. The pattern was collected at 160° C. under 0.4 atm $pH_2O$.
Figure 10:
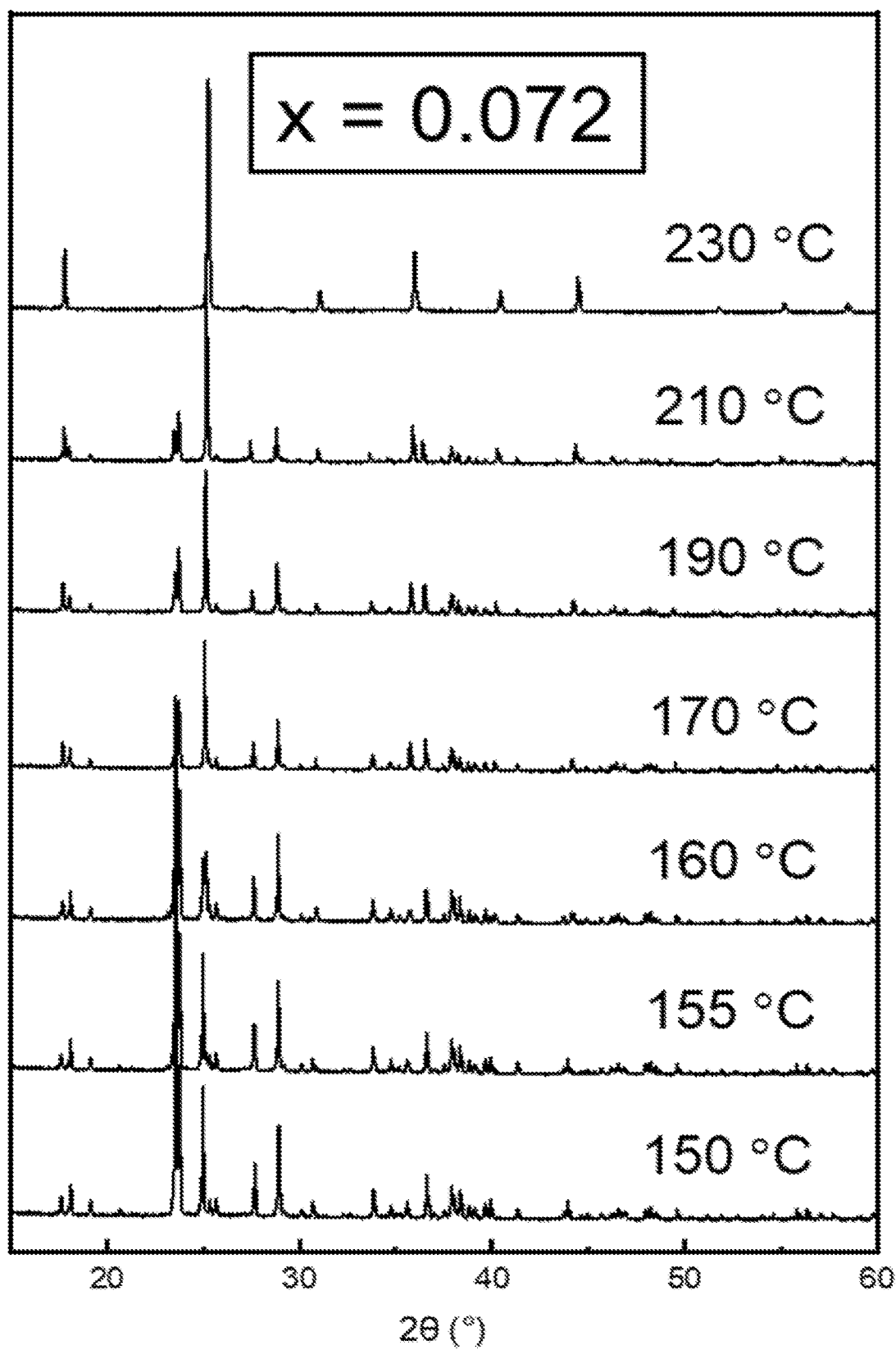
FIG. 10. X-ray diffraction patterns collected from a sample of composition x=0.72 under 0.4 atm $pH_2O$. At 150 and 155° C., the sample exists as a two-phase mixture of CPP and monoclinic CDP. At 160° C., the CPP phase is consumed and a new cubic structure with vacancies on the cation site is formed. Above 160° C., the monoclinic CDP gradually transitions to join the vacancy cubic phase, until at 230° C. only the cubic phase remains.

Results: High Temperature Phase behavior. For all samples in which 0<x<2/9, heating above 90° C. resulted in the reaction forming CPP, such that the sample existed as a two-phase mixture of CPP and monoclinic CDP up to 155° C. Upon heating to 155° C., the samples underwent another superprotonic transition, consuming the CPP phase, to form a superprotonic cubic phase of composition x=0.18. The diffraction pattern of this new cubic phase is shown in FIG. 9. The structure of this new cubic phase is surmised to be nearly analogous to that of cubic CDP with the exception of cation-site vacancies to accommodate the Cs deficiency in the phase stoichiometry. Samples of composition 0<x<0.18 formed a two phase mixture of the vacancy cubic phase and monoclinic CDP at 155° C. Heating above 155° C., samples of composition x<0.18 demonstrated a broad superprotonic transition in which monoclinic CDP gradually transitioned to join the vacancy cubic phase, decreasing the cation-site vacancy content in the cubic phase. The x-ray diffraction patterns of a x=0.072 sample throughout this gradual superprotonic transition are shown in FIG. 10.

Methods: Conductivity. Dense compacts of each sample, approximately 1 mm in thickness, were prepared by pressing mixed powders of CDP and $CsH_5(PO_4)_2$ in a 15 mm die. Electrodes were applied by sputtering 100 nm of Ag on each side. Data were collected under flowing $N_2$ (40 sccm) with the gas humidified to $pH_2O$=0.4 atm at sample temperatures above 130° C. The sample was heated at a rate of 2° C./min in 5-10° C. increments and was held at temperature for 30 minutes prior to measurement. Impedance measurements were conducted using the same analyzer and scan conditions specified in Example 1.

Figures 11A, 11B:
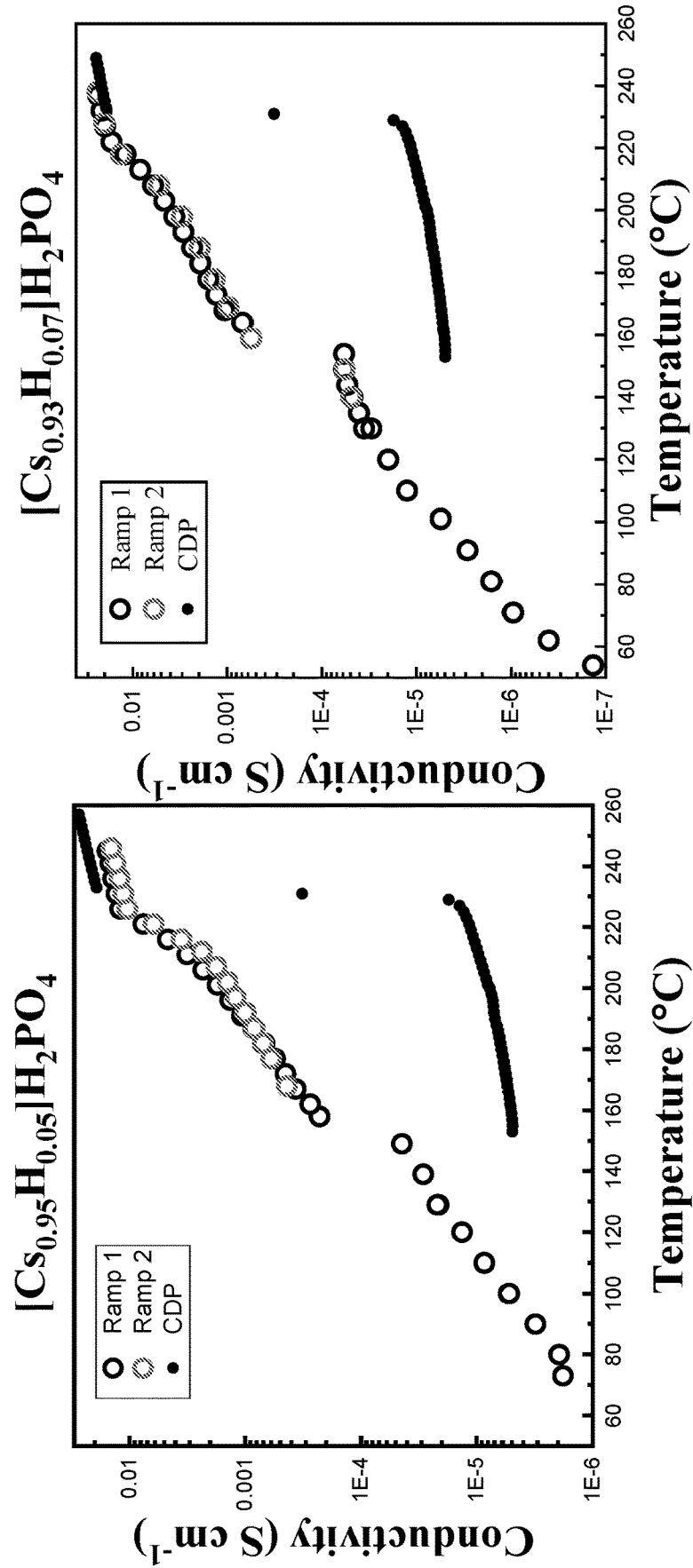
FIG. 11A-11B. Conductivity plots for samples of compositions $[Cs_{1-x}H_x]H_2PO_4$ where x=0.05 (FIG. 11A) and 0.072 (FIG. 11B). For both samples, a humidified atmosphere ($pH_2O$=0.4 atm) was introduced at sample temperatures above 130° C.

Results: Conductivity. The conductivity of the samples at temperatures above 160° C., when the sample is a mixture of the vacancy cubic phase and monoclinic CDP, is of technological relevance, ranging on the order of $10^{-3}$-$10^{-2}$ S $cm^{-1}$. The conductivity trends of samples of composition x=0.072 and 0.05 are shown in FIGS. 11A-11B. In both samples, the jump in conductivity at 160° C. is explained by the increase in superprotonic phase fraction upon the transformation forming the vacancy cubic phase. Heating beyond 160° C., the conductivity of the samples increased to the order of $10^{-2}$ S $cm^{-1}$ as the samples transitioned to become entirely cubic. The reversibility of this transition was demonstrated in the repeated cycles through this temperature range.

Figure 12:
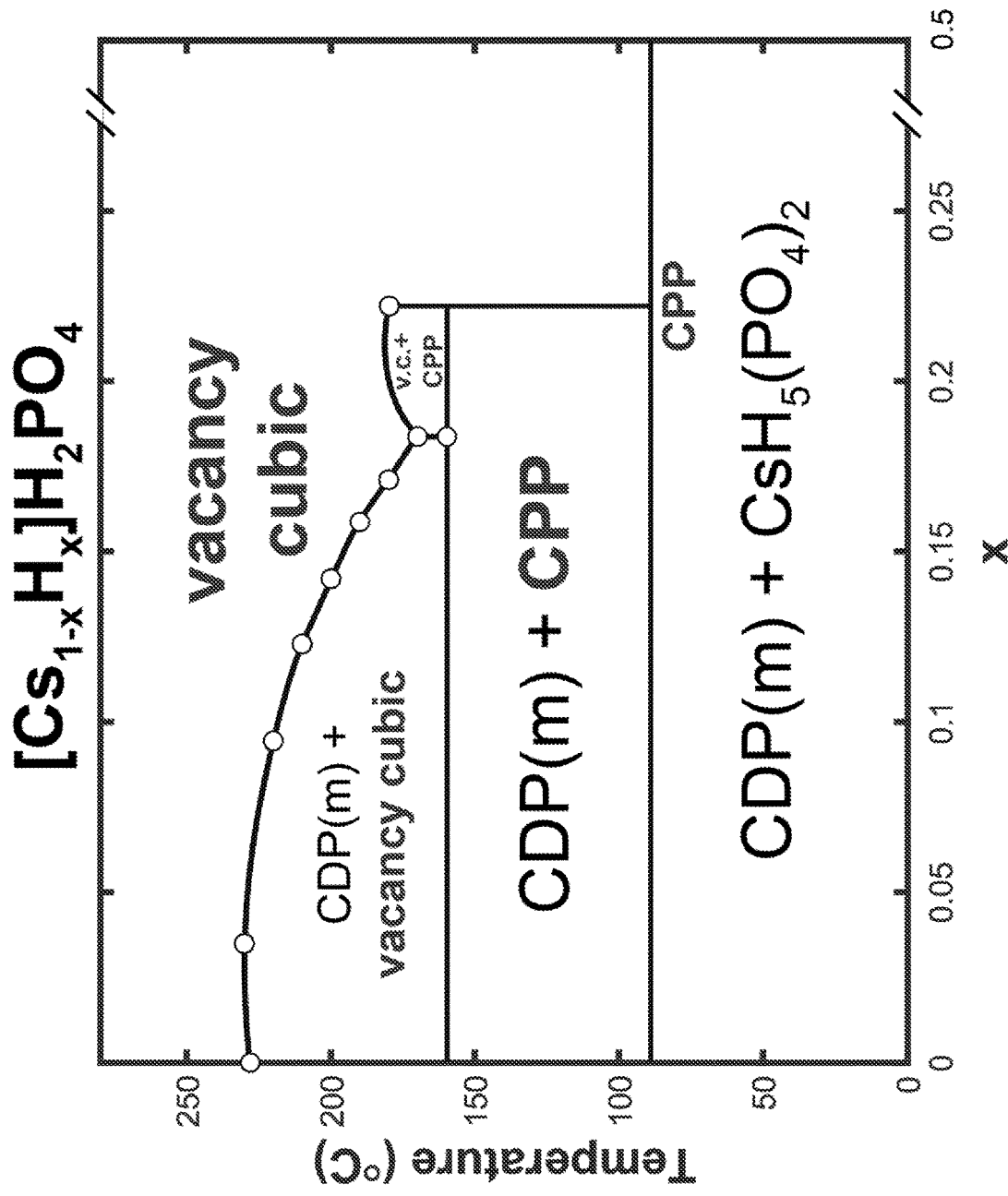
FIG. 12. Phase diagram for the solid acid system described in Examples 1 and 2.

A phase diagram for the solids acids of this example is provided in FIG. 12

The word "illustrative" is used herein to mean serving as an example, instance, or illustration. Any aspect or design described herein as "illustrative" is not necessarily to be construed as preferred or advantageous over other aspects or designs. Further, for the purposes of this disclosure and unless otherwise specified, "a" or "an" means "one or more."

The foregoing description of illustrative embodiments of the invention has been presented for purposes of illustration and of description. It is not intended to be exhaustive or to limit the invention to the precise form disclosed, and modifications and variations are possible in light of the above teachings or may be acquired from practice of the invention. The embodiments were chosen and described in order to explain the principles of the invention and as practical applications of the invention to enable one skilled in the art to utilize the invention in various embodiments and with various modifications as suited to the particular use contemplated. It is intended that the scope of the invention be defined by the claims appended hereto and their equivalents.

What is claimed is:

1. A proton conducting material comprising a superprotonic phase of a solid acid, the superprotonic phase having a cubic structure and the general formula: $[M_{(1-x)}H_y]H_2PO_4$, where M represents one or more monovalent cations or a combination of monovalent cations and divalent cations, $0<x\leq0.2\overline{2}$, and y is a number that provides charge balancing.

2. The material of claim 1, wherein the superprotonic phase has the general formula: $[M_{(1-x)}H_x]H_2PO_4$ and M represents one or more monovalent metal cations.

3. The material of claim 2, wherein M consists of Cs.

4. The material of claim 1, wherein the superprotonic phase comprises rotationally disordered tetrahydroxyphosphonium cations.

5. The material of claim 4, wherein the superprotonic phase of the solid acid has the formula: $Cs_7(H_4PO_4)(H_2PO_4)_8$.

6. The material of claim 1, wherein the superprotonic phase has vacancies at cation sites within the cubic structure.

7. The material of claim 1, wherein M comprises Cs.

8. The material of claim 7, wherein M further comprises at least one additional monovalent cation.

9. The material of claim 8, wherein at least one additional monovalent cation is an alkali metal cation.

10. The material of claim 7, wherein M further comprises at least one additional divalent cation.

11. The material of claim 10, wherein the at least one additional divalent cation is barium.

12. The material of claim 1, wherein the superprotonic phase forms at a temperature in the range from 90° C. to 250° C.

13. The material of claim 1, wherein $0.05<x\leq0.2\overline{2}$.

14. A device comprising an anode, a cathode, and a proton conducting membrane in electrical communication with the anode and the cathode, the proton conducting membrane comprising a superprotonic phase of a solid acid, the superprotonic phase having a cubic structure and the general formula: $[M_{(1-x)}H_y]H_2PO_4$, where M represents one or more monovalent cations or a combination of monovalent cations and divalent cations, $0<x\leq0.2\overline{2}$, and y is a number that provides charge balancing.

15. The device of claim 14, wherein the superprotonic phase has the general formula: $[M_{(1-x)}H_x]H_2PO_4$ and M represents one or more monovalent metal cations.

16. The device of claim 14, wherein the device is a fuel cell, the anode comprises a catalyst for the splitting of hydrogen molecules into protons and electrons, and the cathode comprises a catalyst for oxygen reduction.

17. A method of operating a fuel cell comprising an anode, a cathode, and a proton conducting membrane located between the anode and the cathode, the proton conducting membrane comprising a superprotonic phase of a solid acid at a temperature at which the fuel cell is operated, the superprotonic phase having a cubic structure and the general formula: $[M_{(1-x)}H_y]H_2PO_4$, where M represents one or more monovalent cations or a combination of monovalent cations and divalent cations, $0<x\leq0.2\overline{2}$, and y is a number that provides charge balancing, the method comprising:

feeding a fuel into the anode where it is oxidized to form electrons that pass externally to the cathode and protons that pass through the proton conducting membrane to the cathode; and feeding an oxidizing agent into the cathode where it reacts with the protons from the anode to produce water.

18. The method of claim 17, wherein the fuel comprises $H_2$ and the oxidizing agent comprises $O_2$.

19. A method of making a solid acid that forms a superprotonic phase, the superprotonic phase having a cubic structure and the general formula: $[M_{(1-x)}H_y]H_2PO_4$, where M represents one or more monovalent cations or a combination of monovalent cations and divalent cations, $0<x\leq0.2\overline{2}$, and y is a number that provides charge balancing, the method comprising: reacting a stoichiometric mixture $MH_2PO_4$ and $MH_5(PO_4)_2$.

20. The method of claim 19, wherein reacting a stoichiometric mixture $MH_2PO_4$ and $MH_5(PO_4)_2$ comprises:

maintaining the stoichiometric mixture $MH_2PO_4$ and $MH_5(PO_4)_2$ in a humidified atmosphere at an elevated temperature until the $MH_2PO_4$ and $MH_5(PO_4)_2$ deliquesce to form an aqueous solution; and heating the aqueous solution in the humidified environment to a temperature at which the $MH_2PO_4$ and $MH_5(PO_4)_2$ react and water evaporates to crystallize the $[M_{(1-x)}H_y]H_2PO_4$.

* * * * *